April 28, 1953  R. E. LAMBERT  2,636,913
METHOD AND APPARATUS FOR THE MANUFACTURE
OF GLASS BY ELECTRIC HEATING
Filed July 4, 1945  4 Sheets-Sheet 1

INVENTOR.
Roger Emile Lambert
BY
Dale A. Bauer
ATTORNEY.

April 28, 1953  R. E. LAMBERT  2,636,913
METHOD AND APPARATUS FOR THE MANUFACTURE
OF GLASS BY ELECTRIC HEATING
Filed July 4, 1945  4 Sheets-Sheet 2

INVENTOR.
Roger Emile Lambert
BY
Dale A. Bauer
ATTORNEY.

INVENTOR.
Roger Emile Lambert
BY
Dale A. Bauer
ATTORNEY.

April 28, 1953  R. E. LAMBERT  2,636,913
METHOD AND APPARATUS FOR THE MANUFACTURE
OF GLASS BY ELECTRIC HEATING
Filed July 4, 1945 4 Sheets-Sheet 4

INVENTOR.
Roger Emile Lambert
BY
Dale A. Bauer
ATTORNEY.

Patented Apr. 28, 1953

2,636,913

UNITED STATES PATENT OFFICE 2,636,913

METHOD AND APPARATUS FOR THE MANUFACTURE OF GLASS BY ELECTRIC HEATING

Roger Emile Lambert, Paris, France, assignor to Societe Anonyme des Manufactures des Glaces et Produits Chimiques de Saint-Gobain, Chauny & Cirey, Paris, France Application July 4, 1945, Serial No. 603,206
In France July 1, 1943

Section 1, Public Law 690, August 8, 1946
Patent expires July 1, 1963

18 Claims. (Cl. 13—6)

My invention relates to the method for producing glass where the successive operations such as melting of the batch and refining of the glass are accomplished by means of the heat developed by the passage of an electric current through the glass.

Such heating method is based on the electrical conductivity of the glass when it is in a molten state. Different temperatures are obtained by said heating process, for a given supply of energy, depending upon the method of distributing the electric current through the glass. In glass manufacture, it is in a general way desirable to reach high temperatures and this is even quite necessary in the case where glasses having a high melting point are to be produced, for instance special glasses with a low expansion coefficient. But among other factors, the obtaining of high temperatures is limited by the behaviour of the refractory blocks constituting the walls of the container holding the glass.

My invention has for its object a heating method capable of economically producing sufficiently high temperatures in the glass to accomplish its melting, whilst preserving the container walls themselves from the action of those high temperatures.

The heating method according to my invention consists in placing in the melting zone, and in the central portion of same, vertically adjustable electrodes that are introduced through the bottom of the container and are so arranged as to be in contact with the glass along a part of the height of the bath. The glass in the zones surrounding the electrodes, as a result of the concentration of the current lines, is heated to a higher temperature than the glass of the other parts of the bath. According to my invention the glass of said zones rises by convection vertically along the electrodes and remains thus in prolonged contact with the electrodes and consequently arrives below the batch lump after having reached a still higher temperature. The materials to be melted are thus submitted to the combined action of a high temperature and of a stirring motion which both contribute to a rapid melting. The hot glass currents, issuing from the central portion of the melting zone, reach the container walls only after having come in contact with the batch lump and after having horizontally travelled from the center to the walls in divergent paths along which the glass temperature and speed decrease, thus reach a condition which reduces to a large extent their corrosive action on said container walls. Moreover said several glass currents coming from the melting zone in radiating directions have no tendency to push the batch lump in a determined direction and out of the melting zone; but their only effect is to disaggregate little by little the lowest part of the lump, constantly renewing the part of said lump which is subjected to a direct contact with the currents of hot glass rising from the electrodes.

My invention may be applied either to continuous or to discontinuous production of glass.

In the case of discontinuous production of glass, which is defined in United States Patent 2,281,408, page 1, column 1, lines 16–30, in which the successive operations of progressive filling of the raw materials, melting, refining, and taking out of the glass for its final use are all effected in the same container the invention has the particular advantage of enabling one to easily increase the contact surface of the electrodes with the glass in proportion to the rising of the glass level in the container. For that purpose, the electrodes are progressively introduced into the container following the rising of the glass level. The advantage of this adjustment is that no modification is brought to the respective position of the hot zone in relation to the container's side walls as well as to the batch lump, during the melting period. According to another advantage resulting from the use of my method for discontinuous glass furnaces, the electrodes may be lowered so as to give room in the container at the time the glass is ladled from the pot, and consequently they do not hinder in any way said ladling when the glass level decreases in the container.

In the case of continuous production the raw materials to be melted are continuously fed at one end of the tank and the finished glass is taken out at the other end, so that in the course of its travel from one end of the tank to the other, the materials will be submitted to the successive operations of melting, refining and temperature conditioning until the glass is ready to be worked.

According to another embodiment of my invention when using my method for the continuous production of glass, vertical electrodes of the above described type placed in the melting zone are associated with horizontal electrodes placed in the refining zone, the latter penetrating into the glass through the side walls of the tank and being located near the surface of the glass. Such horizontal electrodes placed in the refining zone are already known but what I claim in the present invention is their association with vertical electrodes placed in the melting zone and penetrating into the glass through the tank bottom in the central portion of the melting zone. Owing to said arrangement, the molten glass not yet refined and still full of bubbles, consequently light, tends to remain at the upper part of the tank and comes into the hot zone produced in the neighborhood of the refining electrodes where it is brought to a high temperature favourable for said refining.

Whether the invention applies to continuous or to discontinuous glass production, the arrangement of the electrodes enables one to obtain a favourable localization of the heat, advantageous as well for the melting of the batch as for the preservation of the container walls, thus enabling the production of a high quality glass even in the case of hard glass.

Several embodiments of the invention are hereunder described by way of examples. Referring to the accompanying drawings.

Figure 7:
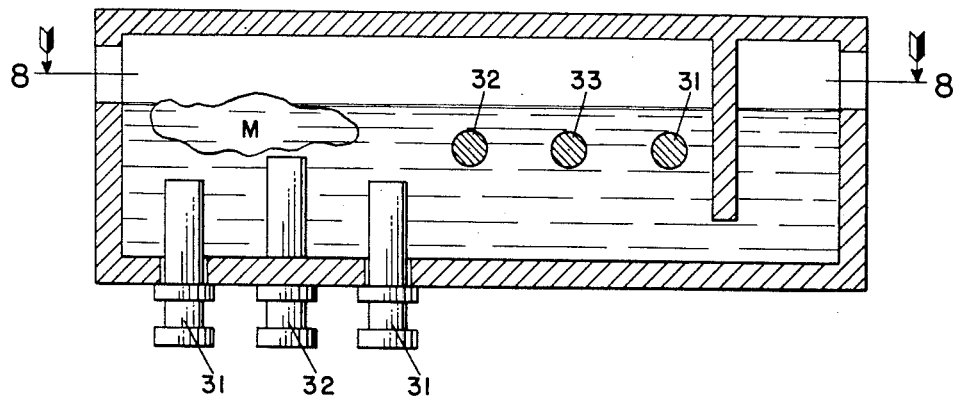
Figure 8:
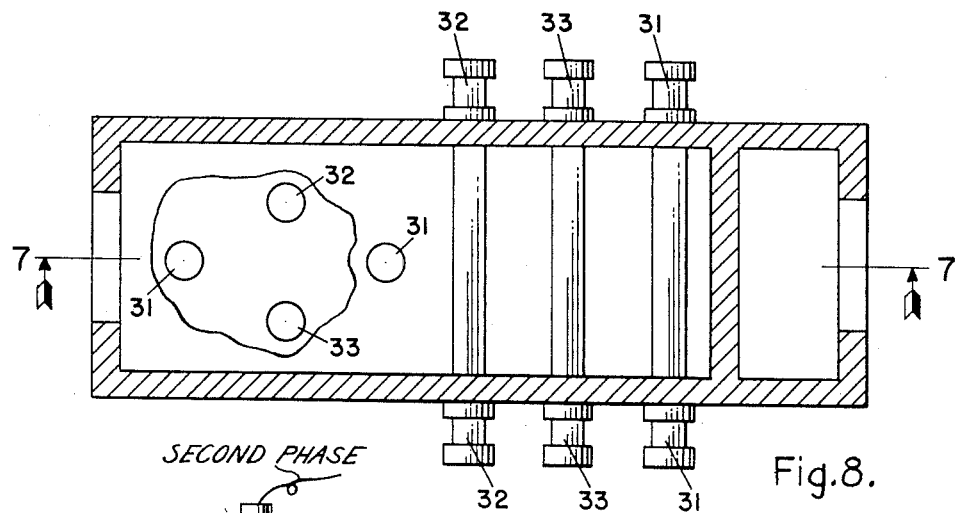

Figs. 7 and 8 are respectively vertical and cross sections of a tank of the type described in the invention, employed in the manner described in lines 40 and 50 of column 5. In these figures the numerals 31, 32, 33 refer to phases for illustrative purposes.

Figure 9:
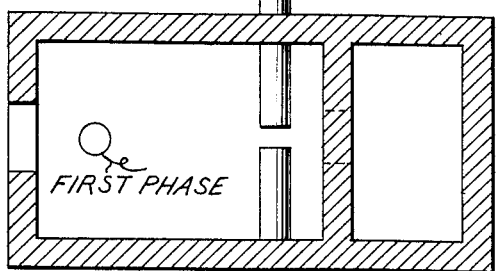

Figure 9 is a horizontal sectional view through a glass furnace having a single electrode under the lump and the remaining electrodes of a three phase system in the fining zone.

Figure 1:
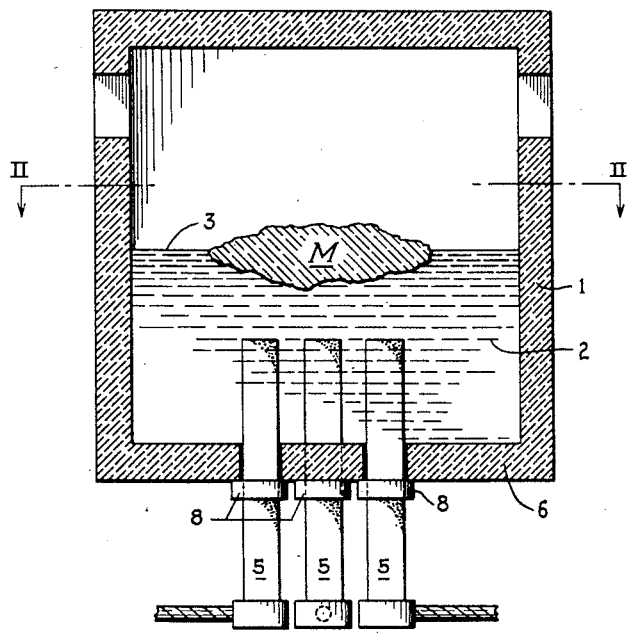
Fig. 1 is a vertical section of a furnace for discontinuous production using the method according to my invention.

In Fig. 1 of the drawings, 1 represents the tank wall, 2 the glass bath, and 3 the bath level. According to the invention, the heating of the furnace is accomplished by means of vertical electrodes 5 penetrating into the furnace bottom 6 by suitably cooled metal boxes 8 which prevent the molten glass from flowing around the electrodes through the tank bottom and which also enable the electrodes to be moved in relation to said bottom. Such electrodes are disposed in the central portion of the tank so as to be remote from its vertical walls.

Figure 2:
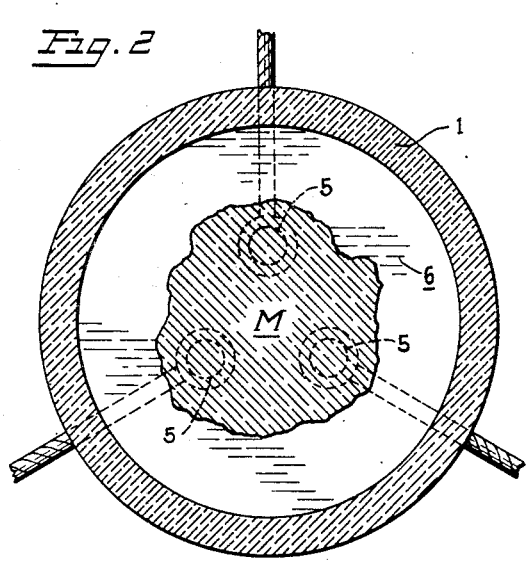
Fig. 2 is a horizontal section along line II—II of Fig. 1.
Figure 3:
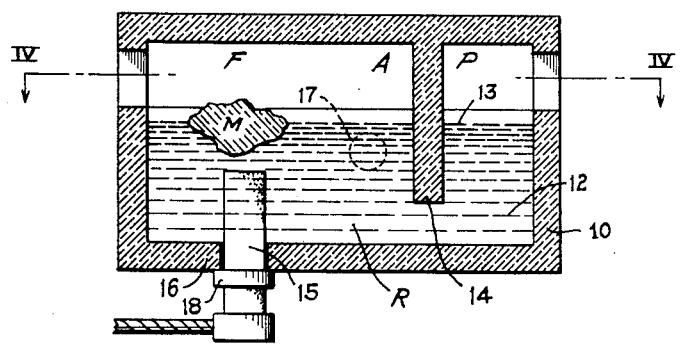
Fig. 3 is a longitudinal axial section of a furnace according to the invention, for continuous production.
Figure 4:
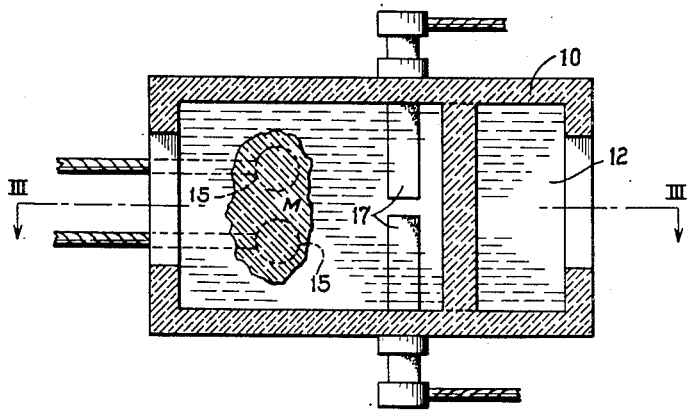
Fig. 4 is a horizontal section along line IV—IV of Fig. 3.

Figures 1 and 2 show by way of example three electrodes 5, 5, 5 which may be of graphite disposed according to an equilateral triangular arrangement concentric with the tank; they are supplied with three-phase current.

For starting the furnace, the electrodes are lowered as much as possible, a comparatively shallow layer of glass being sufficient to cover them and to protect them against air oxidization.

As the furnace is progressively filled with raw materials, the electrodes will be raised into the furnace in such a manner as to follow the rising of the upper level 3 of the bath while remaining, if desired, at a certain distance from the lump M of the materials to be melted. Thus while the container is progressively filled, the surface of the electrodes in contact with the glass is increased; due to the vertical arrangement of the electrodes, the duration of the contact of the glass rising vertically along the electrodes is also increased.

Owing to said prolonged contact, when the glass convection currents from about the electrodes rise under the lump of raw materials they are at a very high temperature and consequently particularly able to attack the lump and ensure its rapid melting, even in the case of hard glasses.

During the withdrawing of the finished glass, for instance by ladling, the electrodes may be lowered so that the ladling operation will not be hindered by the electrodes.

In Figs. 3 to 6 referring to the application of the invention to continuous furnaces, 19 is the tank wall, 12 is the glass bath and 13 the upper level of the bath. 14 is a bridge wall separating the melting and refining compartments F and A from the extraction compartment P where the temperature of the glass is conditioned.

According to the invention, electrodes 15 placed in the melting compartment F penetrate through the bottom 16 of the tank, the tightness being secured by cooling metal boxes 18. These electrodes are located in the bath at such a level that their upper part comes near the lower portion of the lump M of raw materials.

In the refining zone A is situated an electrode 17 placed transversely to the glass bath and practically on the whole width of same. Such electrode is immersed in the upper layers of the bath.

The furnace can be supplied with three-phase current, the two electrodes 15 being each connected to one phase and the two elements constituting the electrode 17 being connected to the third phase.

Owing to the vertical arrangement of the melting electrodes 5 and 15, the glass surrounding the electrodes is overheated in said zone on account of the concentration of the current lines, and tends to rise vertically while remaining in contact with the electrode itself; the overheating of the glass in the zones surrounding the electrodes is thus further increased because each particle of glass remains a longer time in this overheated zone. When said glass reaches the upper layers of the bath it is at a very high temperature that causes a rapid melting of the batch materials of the lump M.

The electrode 17 acts only on the upper part of the bath and in a zone between the melting zone F and the zone of extraction of the finished glass, P. The melted glass not yet refined and containing bubbles, gathers in said intermediate zone. Electrode 17 acts on said glass as a refining electrode.

The communication between the refining compartment A and the extraction compartment P takes place through a passage at the bottom of said two compartments.

An advantage of the type of furnace according to my invention is the possibility of varying the level of the upper end of the vertical electrodes in the melting zone. Such adjustment may be used to control the apportionment of the phases between the electrodes 15 and 17, either to balance them, or to give any desired value to the relation of the phases to each other. It must be noted that when modifying the level of the upper end of such vertical electrodes, the position of the hot zone created by the electrodes is not substantially modified.

The vertical adjustment of the vertical electrodes in the melting zone can be utilized, in conformity with my invention, for heating the glass during the initial period of starting the furnace, when the furnace is progressively filled in a way similar to that described in the case of discontinuous furnaces.

To that end the vertical electrodes 15 are lowered as much as possible so that they will be covered by a layer of materials which can be shallow. While the materials are melting and the bath level is rising in the furnace, such electrodes are raised to accompany the rise of the glass level. During this preliminary heating operation, the horizontal refining electrodes are out of the bath and do not act in the heating operation of the furnace, this heating being obtained only by the electric current supplied to the glass by the electrodes of the melting zone.

In a general way, in the case of continuous furnaces as well as for discontinuous furnaces, the advantage of the vertical electrodes is that said electrodes may be given an overload of current whereby there is obtained a very high temperature for the glass passing in the neighborhood of said electrodes. The reasons against an overload of the electrodes are generally that the temperature reached is harmful to the tank walls, or that it causes a disaggregation of the graphite of the electrodes spoiling the glass. In the arrangement according to my invention, such drawbacks do not occur or they occur at a rate which is not harmful because the vertical electrodes are placed sufficiently far from the walls and, moreover, the glass which has been in contact with the electrodes and might carry disaggregation elements of same, rises vertically, meets the not yet vitrified elements of the lump M and is purified by mixing with the oxidizing materials liberated by said lump.

The type of continuous furnace of the accompanying drawings shows only two vertical electrodes in the melting zone, but it is obvious that, without departing from the scope of my invention, a greater number of vertical electrodes may be used, particularly several groups of vertical elements, the upper ends of which may be situated at different levels in the glass bath—also several horizontal electrodes might be placed in succession to one another in the refining zone.

In the described example referring to the use of three-phase currents, the electrodes of two of the phases are placed in the melting zone. The advantage of such arrangement is to obtain a great heating capacity in the melting zone, but it is possible to place the electrodes of two of the phases in the refining zone and to use but one phase for the electrodes of the melting zone.

The invention, which has been hereinabove described as supplied with three-phase current, can be operated with any current and in particular with monophase current. In this latter case, it is possible to connect to one of the poles a part of the melting electrodes and a part of the refining electrodes and to connect to the other pole the rest of the melting electrodes and of the refining electrodes.

Figure 5:
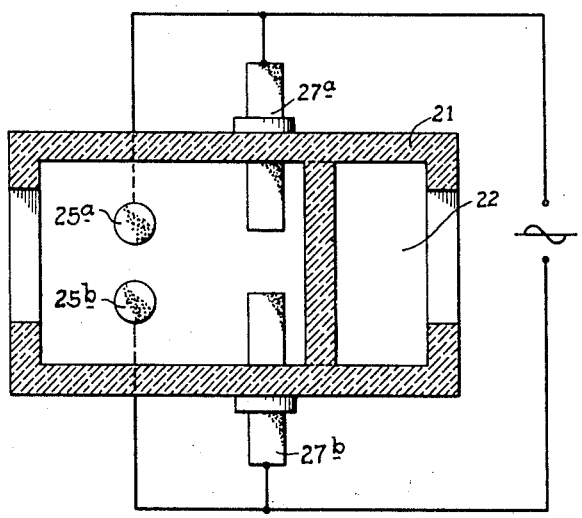
Fig. 5 is a horizontal section of another embodiment of the invention for continuous production.
Figure 6:
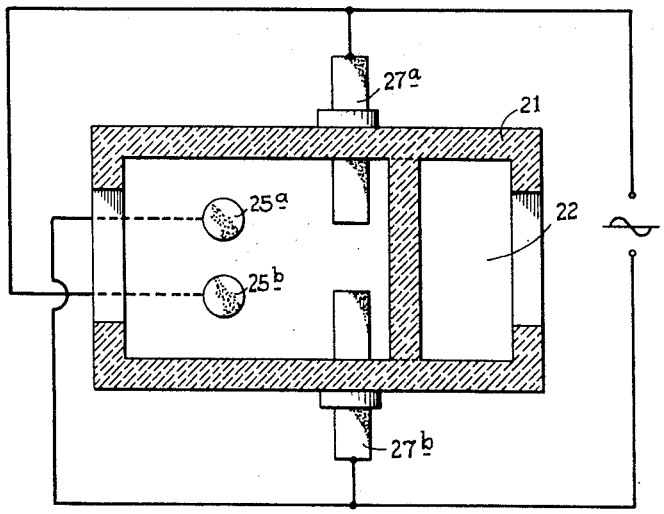
Fig. 6 is a horizontal section of another embodiment.

Figs. 5 and 6 illustrate, as examples, two embodiments of furnaces supplied by monophased current. In the embodiment shown on Fig. 5, electrodes 25a and 25b of the melting zone are respectively connected each to one pole of the source as well as to one of the electrodes 27a or 27b of the refining zone. In the embodiment shown on Fig. 6, the electrode 25a of the melting zone is connected to electrode 27b of the refining zone, and to one of the poles of the source while the other electrode 25b is connected to electrode 27a and to the other pole of the source.

In the above specification, the expression "vertical electrode" must be construed as referring not only to electrodes placed quite vertically but also to those located in a position near the vertical one and somewhat inclined in relation to a vertical axis.

It will be obvious that the examples hereinbefore described are given by way of mere illustration and that modifications may be made in details of construction and arrangement without departing from the scope of the invention.

What is claimed is:

1. A method for the manufacture of glass which comprises heating the glass bath by an electric current passing through said glass bath between substantially vertical electrodes in contact with the glass bath along at least a part of the height of said bath, all the vertical electrodes being submerged in said glass bath beneath the lump of the batch materials and remote from the vertical sides of the glass bath.

2. A method for the manufacture of glass by the heat developed by an electric current passing through the glass mass between electrodes which comprises feeding batch materials on the surface of a molten glass bath, and melting said materials by the action of hot glass currents which rise from the hot zones of the bath produced by the concentration of the electrical current lines in the neighbourhood of substantially vertical electrodes submerged in the glass bath beneath the lump of the batch materials all of which are remote from the vertical sides of the glass bath, said glass currents coming in contact with the lower part of the batch lump after having been brought, while rising, to a high temperature by their prolonged contact with the vertical electrodes.

3. A method for the manufacture of glass which comprises heating the glass mass by an electric current supplied by substantially vertical electrodes penetrating through the bottom of the container and remote from the walls of said container, starting the melting operation when the upper portions of the electrodes are located close to the bottom of said container and covered with a shallow layer of molten glass which is heated by the passage of the electric current through it, feeding batch materials on the glass bath, raising the electrodes within the container when and as the glass level rises in said container while maintaining the electrodes constantly covered by the glass.

4. A method for the manufacture of glass which comprises heating the glass bath by an electric current passing through said glass bath between substantially vertical electrodes placed in the central portion of the melting zone and penetrating into the glass through the bottom of the container, said electrodes being situated under the batch lump, and remote from the vertical sides of the glass batch, and being in contact with the glass bath along at least a part of the height of said bath, controlling the heating of the bath by adjusting, for at least one electrode of the melting zone, the height of its part in contact with the glass bath.

5. A method for the manufacture of glass which comprises heating the glass bath by a polyphase electric current passing through said glass bath and supplied by a plurality of substantially vertical electrodes placed in the central portion of the melting zone, said electrodes being in contact with the glass bath along at least a part of its height, and balancing the load of the phases by adjusting, for at least one of the electrodes of the meliting zone, the length in contact with the glass bath.

6. A method for the continuous manufacture of glass by the heat developed by an electric current passing through the glass mass between electrodes which comprises supplying the electric current to the glass bath in the melting zone by substantially vertical electrodes in contact with the glass bath along at least a part of the height of said bath, said electrodes projecting through the bottom of the bath in the central portion of the melting zone beneath the lump of the batch materials and being all remote from the vertical sides of the glass bath, and supplying the electric current to the bath in the refining zone by at least one electrode placed horizontally in the glass bath near the surface of same.

7. A method for the discontinuous manufacture of glass which comprises feeding batch materials on the glass bath, heating said glass bath by an electric current supplied by substantially vertical electrodes in contact with the glass bath along a part of its height, said electrodes penetrating through the bottom of the container and being remote from the walls of said container, and raising the electrodes within the glass bath when and as the glass level rises.

8. A method for the discontinuous manufacture of glass which comprises heating the glass bath by an electric current supplied by substantially vertical electrodes penetrating through the bottom of the container and remote from the walls of said container, starting the melting operation when the upper portions of the electrodes are located in close proximity of the bottom of said container and covered with a shallow layer of molten glass which is heated by the passage of the electric current through it, feeding batch materials on the glass bath, raising the electrodes within the container when and as the glass level rises in said container, then, when the glass is finished, withdrawing it from the container and lowering the electrodes when and as the glass level decreases, the electrodes remaining constantly covered by the glass.

9. In an electric furnace for the manufacture of glass, a container for the glass mass, electrodes supplying an electric current to the glass mass placed in the melting zone substantially vertically in the central portion of said zone under the lump of the batch materials and penetrating through the bottom of the container, all said electrodes being in contact with the glass bath along at least a part of its height and being remote from the vertical walls of the container.

10. An electric furnace for the continuous manufacture of glass by the heat developed by an electric current passing through the glass between electrodes, in which the electrodes of the melting zone are placed substantially vertically in the central portion of said zone under the lump of the batch materials and penetrate through the bottom of the container in positions remote from the walls, at least another electrode being located in the refining zone of the tank and placed horizontally in the glass bath near the surface of same.

11. An electric furnace for the continuous manufacture of glass by the heat developed by an electric current passing through the glass between electrodes, in which the electrodes of the melting zone are placed substantially vertically in the central portion of said zone under the lump of the batch materials and penetrate through the bottom of the container in positions remote from the wall, at least another electrode being located in the refining zone of the tank, placed horizontally in the glass bath near the surface of same and extending substantially over the whole width of the bath.

12. A furnace for the continuous manufacture of glass by the heat developed by a three phase electric current passing through the glass between electrodes, comprising in the melting zone two vertical electrodes, each being connected to one phase of a source of a three phase current, said vertical electrodes being placed in the central portion of the melting zone under the location of the lump of the batch materials, penetrating through the bottom of the container, and in the refining zone a horizontal electrode penetrating through the side walls of the tank, this electrode being connected to the third phase of the electric source.

13. A furnace for the continuous manufacture of glass by the heat developed by a monophase electric current passing through the glass between electrodes, comprising in the melting zone two vertical electrodes, each being connected to one pole of a source of electric current, said vertical electrodes being placed in the central portion of the melting zone under the location of the lump of the batch materials, penetrating through the bottom of the container, and in the refining zone a horizontal electrode penetrating through the side walls of the tank, composed of two elements, each element being respectively connected to the same pole as the vertical electrode placed on the same side of the tank in relation to the longitudinal axis of same.

14. A furnace for the continuous manufacture of glass by the heat developed by a monophase electric current passing through the glass between electrodes, comprising in the melting zone two vertical electrodes, each being connected to one pole of a source of electric current, said vertical electrodes being placed in the central portion of the melting zone under the location of the lump of the batch materials, penetrating through the bottom of the container, and in the refining zone a horizontal electrode penetrating through the side walls of the tank composed of two elements, each element being respectively connected to the same pole as the vertical electrode placed on the opposite side of the tank in relation to the longitudinal axis of same.

15. An electric furnace for the discontinuous manufacture of glass by the heat developed by an electric current passing through the glass between electrodes, comprising a container provided with a plurality of electrodes penetrating through the bottom of said container, remote from the side walls of same, means to connect said electrodes to a source of electric current, and means to adjust the level of the upper portions of the electrodes in relation to the bottom of the container.

16. A method for the continuous manufacture of glass by the heat developed by an electric current passing through the glass mass between electrodes which comprises supplying the electric current to the glass bath in the melting zone by at least one substantially vertical electrode extending upward in contact with the glass bath from the bottom of the bath, said electrode being located in the central portion of the melting zone beneath the lump of the glass materials and remote from the vertical side walls of the glass bath, and at least one other electrode in another zone of the furnace.

17. A method for the continuous manufacture of glass by the heat developed by an electric current passing through the glass mass between electrodes which comprises supplying the electric current to the glass bath in the melting zone by substantially vertical electrodes extending upward in contact with the glass bath from the bottom of the bath, all said electrodes being located in the central portion of the melting zone beneath the lump of the batch materials and remote from the vertical sides of the glass bath, and supplying heat to the fining zone by any other suitable means.

18. An electric furnace for the continuous manufacture of glass by the heat developed by an electric current passing through the glass between electrodes, comprising a container provided with electrodes, at least one of said electrodes being substantially vertical and penetrating through the bottom of the melting zone of said container under the location of the lump of raw materials and remote from the side walls of the container, means to connect the electrodes to a source of electric current, and means to adjust the level of the upper portion of said vertical electrode in relation to the bottom of the container.

ROGER EMILE LAMBERT.

References Cited in the file of this patent

UNITED STATES PATENTS

| Number | Name | Date |
|---|---|---|
| 766,771 | Richardson | Aug. 2, 1904 |
| 1,186,076 | Chambers | June 6, 1916 |
| 1,594,496 | Clark | Aug. 3, 1926 |
| 1,827,472 | Hitner | Oct. 13, 1931 |
| 1,880,541 | Wadman | Oct. 4, 1932 |
| 1,889,516 | McIntosh | Nov. 29, 1932 |
| 1,897,973 | Wadman | Feb. 14, 1933 |
| 1,905,534 | Wadman | Apr. 25, 1933 |
| 2,089,690 | Cornelius | Aug. 10, 1937 |
| 2,119,949 | Blau et al. | June 7, 1938 |
| 2,122,469 | Hitner | July 5, 1938 |
| 2,225,616 | Borel | Dec. 24, 1940 |
| 2,267,537 | Romazzotti | Dec. 23, 1941 |
| 2,293,948 | Peyches | Aug. 25, 1942 |

FOREIGN PATENTS

| Number | Country | Date |
|---|---|---|
| 489,207 | Great Britain | July 21, 1938 |
| 498,379 | Great Britain | June 6, 1939 |

OTHER REFERENCES

Serial No. 295,028, Peyches (A. P. C.), published April 27, 1943.